(No Model.)
L. T. PYOTT.
COMPANION SECTIONAL TRUCK FOR RAILWAY CARS.
No. 575,068. Patented Jan. 12, 1897.
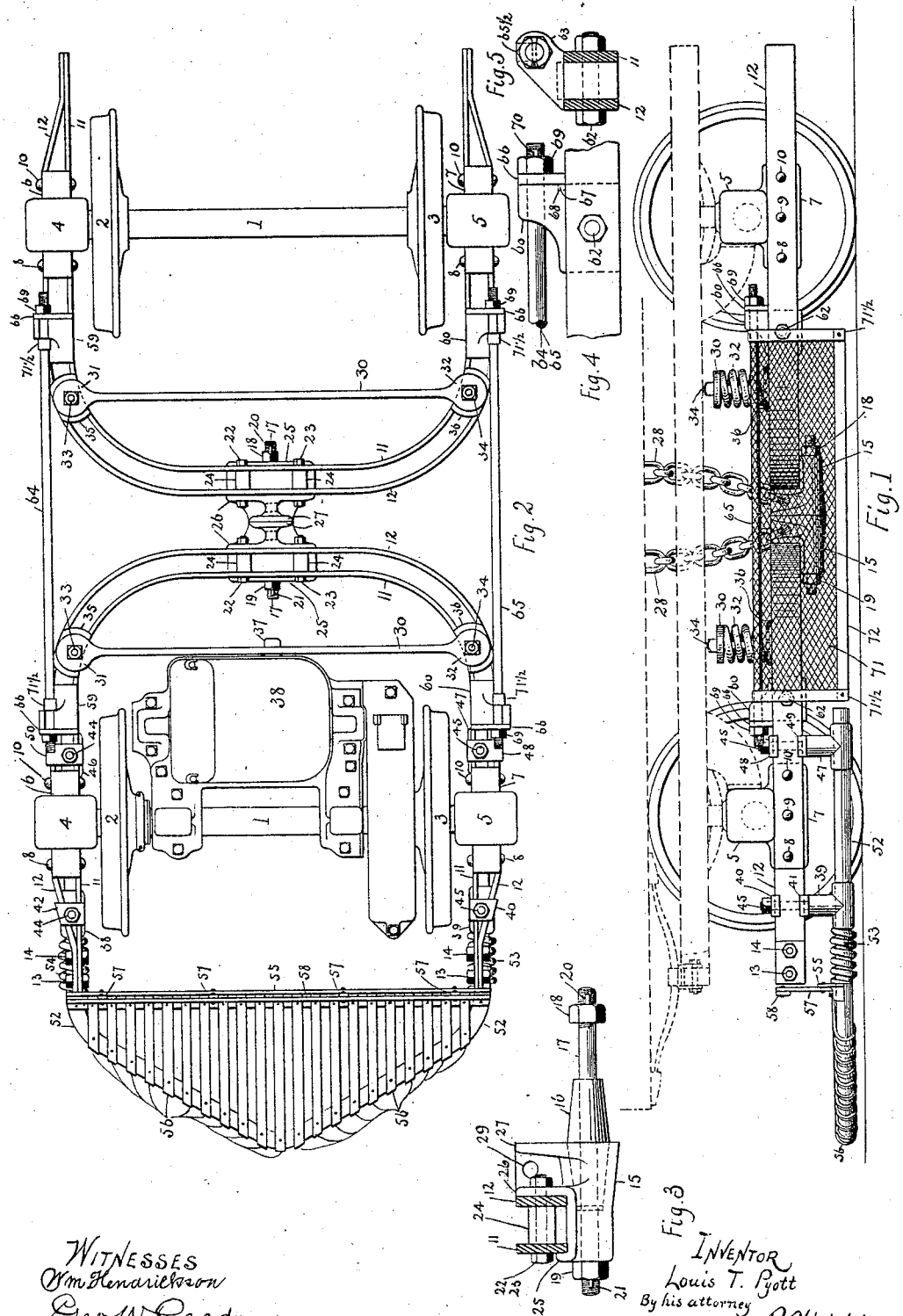
WITNESSES
Wm Henarielsson
Geo W Reed
INVENTOR
Louis T. Pyott
By his attorney
R. Albright

UNITED STATES PATENT OFFICE.

LOUIS T. PYOTT, OF PHILADELPHIA, PENNSYLVANIA.

COMPANION SECTIONAL TRUCK FOR RAILWAY-CARS.

SPECIFICATION forming part of Letters Patent No. 575,068, dated January 12, 1897.

Application filed June 1, 1896. Serial No. 593,742. (No model.)

*To all whom it may concern:*

Be it known that I, LOUIS T. PYOTT, a citizen of the United States, residing at Philadelphia, in the county of Philadelphia and State of Pennsylvania, have invented certain new and useful Improvements in Companion Sectional Trucks for Railway-Cars; and I do declare the following to be a full, clear, and exact description of the invention, such as will enable others skilled in the art to which it appertains to make and use the same, reference being had to the accompanying drawings, and to the figures of reference marked thereon, which form a part of this specification.

My invention relates to improvements in power-driven trucks for railway purposes where the propelling mechanism is attached to the truck; and the objects of my improvements are to provide a four-wheel truck in two sections, so that one section with its wheels and axles, frame, end and side guards, journal-boxes, motor, supports, and all parts may be readily and quickly removed from its place under the car and from its union with its companion section, thus enabling much better care to be taken of the truck and motor and much time saved in renewals and repairs. The longitudinal pivot employed to connect the two sections of my companion truck enables the axle and wheels of each motor to always be truly alined with all of the attachments to the axle and to be transversely in exact parallelism with the track it passes over, thus insuring the full tractive power of the motor being utilized and losses from slip and friction reduced to a minimum. I also by my safety connecting-links secure excellent and efficient guards to prevent persons or any object from coming in contact with the wheels. The means employed to apply the truck to the car will be the method patented to me July 16, 1895, No. 542,776, although other methods with two-legged pedestals may be adapted to go with my truck. I attain these objects by the mechanism illustrated in the accompanying drawings, in which—

Figure 1 is a side elevation of the trucks. Fig. 2 is a plan view of the trucks. Fig. 3 is an elevation of the longitudinal central pivot. Fig. 4 is a side view, and Fig. 5 an end view, of the tie-bar lug.

Similar figures of reference are used on each view for similar parts.

Each section of my truck has an axle 1 with wheels 2 3 thereon, the axle being carried in axle-boxes 4 5. Below the bearing part of the boxes there are formed filling-pieces 6 7, made integral with each box and secured by rivets or bolts 8 9 10 to the bars 11 12 of the framing.

The general shape of the truck-frame is that of the letter U, bars 11 12 being parallel, extending forward of the axle-boxes. This conforms to the open end of the U, while the inner end is curved across similar to the U at its connected part. Bar 12 at its outer end is bent inward and is joined to 11 by bolts 13 14. The frame of one section does not touch the frame of the other section, but is pivotally connected, as hereinafter described. At the inner end of the frame, midway across it, I secure a seat 15 for a double conical longitudinal pivot-sleeve 16, having therein a longitudinal pivot-bolt 17, having nuts 18 19 at each end, and outside of the nuts cotter-keys 20 21. The half-seats 15 are bolted to frame-bars 11 12 of each section by bolts 22 23. Over each bolt is a filling-piece 24 to prevent frame-bars 11 12 being forced together. Lug 25 bears against bar 11 and a flange 26 against bar 12. A lug 27 comes to the central line between the truck-sections and abuts a similar lug on the other half-seat, which is an exact counterpart of 15, and is secured to the other section or the companion truck. Means are provided on each half-seat 15 to secure a chain 28 at 29. This chain is secured at its other end to the car-body or subframing and will be hereinafter described.

A motor-support 30 is seated upon springs 31 32 at each end, the springs resting upon frames 11 12 and secured by bolts 33 34 to seats, and filling-pieces 35 36 support the springs 31 32. At 37 a trunnion from the motor-case 38 is inserted through support 30.

At the front of each axle-box 4 5 are end guard-supports 38 39, secured to clips 40 41 42 43 by bolts 44 45, and back of each axle-box 4 5 are similar supports and attachments 46 47 48 49 50 51. Through 38 39 46 47 a framework 52 is inserted. This is preferably an iron pipe. It is bent toward the center after reaching the front of each frame 11 12 and thereafter goes forward at an angle toward the center, where it gently curves, presenting an angular nose to push obstructions aside. Springs 53 54 abut 38 and 39 and at their front end are held in by an angle-iron 55, which is secured at each of its ends to framework 52. The springs 53 54 cushion the shock due to a blow whenever the framework 52 comes in collision with an object. From angle-iron 55 slats 56 reach outward and are secured to framework 52. In place of these slats 56 a netting might be secured, which would answer every purpose, as it is to receive any body caught up and carry it until it can be removed. Upwardly from angle-iron 55 are uprights 57, joined together at their tops by a horizontal piece 58, the design being to furnish a fence or back-stop to prevent any body projected upon the guard from being thrown against or under the wheels.

At the sides of my sectional truck will be seen lugs 59 60, secured between bars 11 12 of the frame by bolts 61 62. The upper part 63 of the lug reaches outward and is bifurcated to allow tie-bars 64 65 to be dropped into a pocket 65½. A washer 66, having a lip 67 fitting into a pocket 68 in 63, is also provided for each lug. The opening in the washer is entirely encircled by metal and is loose on the tie-bar to allow free movement of the tie-bar to accommodate the twist due to the movement of each section over the pivot, and when the lip 67 is inserted into the pocket 68 and the nut 69 screwed up and the cotter 70 is in place the tie-bar cannot be lifted out of the lug 63, but when the nut 69 is unscrewed far enough to release the lip 67 from the pocket 68 the tie-bar can readily be lifted out. The tie-bars are also made to serve as side guards, and for that purpose I attach netting 71 to them to hang downward, it being free on the tie-bar. The netting is secured at its lower end by a longitudinal piece 72 and at its ends to supports 71½, also free on the tie-bar. This will prevent obstructions or persons from coming in contact with the wheels. It will be readily understood that upon withdrawing the cotter 20 and unscrewing the nut 18 the pivot-bolt 17 and double conical seat may be withdrawn from the seat 15 on the front section or companion truck. Then the cotters 70 being removed from tie-bars 64 65, the nuts 69 unscrewed enough to allow lip 67 of washer 66 to leave pocket 68 of 59, the tie-bars can be removed and one section of the companion trucks removed from under the car, the chain 28 being unhooked. The other section will remain in its normal position under the car, its inner end being supported by chain 28. The end guard 52 may also readily be withdrawn from its supports 38 39 46 47 at any desired time, or the end guards and side guards may at any time be removed, as described, and the companion trucks remain attached together in their position under the car.

The form of axle-box shown is that patented to me August 13, 1895, No. 544,717, but this form is not essential for any purpose except a quick removal of the axle and wheels. The truck for which I secured a patent, as above, has a transverse pivotal movement, but my present invention is specially adapted to the application of gearless or direct-acting motors and their ready withdrawal for inspection, as only the one requiring attention need be removed from under the car.

I claim—

1. A four-wheeled truck composed of companion sections, wheels and an axle for each section, axle-boxes for each section secured to under frames, integral-bar frames for each section of U shape, and a union of the two sectional frames by a longitudinal pivot, as and for the purpose set forth.

2. In a sectional four-wheeled truck, wheels and an axle for each section, U-shaped frames having axle-boxes thereto attached and supported, a central longitudinal pivot seated on each frame, means to secure the pivot in place and unite the sections, and means to tie the two sections together at the outer sides of the frames, substantially as set forth.

3. In a sectional truck having an axle and wheels for each section, the axle carried in axle-boxes rigidly attached to double integral-bar U-shaped frames, longitudinal pivotal connections for each section to the other, side tie-bars attached to the frames but removable therefrom and a central support from each section of U-shaped frames to the car-body or subframing, all substantially as described.

4. In a sectional truck, wheels and an axle for each section, integral-bar frames carrying axle-boxes, having means for their pivotal union, longitudinally, each with its companion section, means for coupling and uncoupling each section at the central pivot and at each side and side guards depending from the side couplings, substantially as described.

5. In a sectional truck, wheels and an axle for each section, U-shaped frames composed of integral rectangular bars, a longitudinal central pivoted union to join the two sections, means to join the sections at the sides, and unjoining means therefor, central supports for each section to the car-body or subframe, and end guards for each section, substantially as described.

6. In a sectional truck, means for its movement upon the track, a central longitudinal pivoted union for the joining of the sections, side unions for the same purpose, each having means for attaching and detaching from the frames, side guards, removably attached;

end guards, removably attached, and having means to cushion the shocks they receive, substantially as specified.

7. In a sectional truck, wheels and an axle for each section, boxes for the axles supporting frames of integral bars, means for central longitudinal pivotal union, means for side unions, side guards pendently and yieldingly supported, front guards supported for longitudinal yielding, and means for yieldingly supporting a motor from the frames, substantially as described and set forth.

In testimony whereof I affix my signature in presence of two witnesses.

LOUIS T. PYOTT.

Witnesses:
 GEO. W. REED,
 R. C. WRIGHT.